(12) United States Patent
Takagi et al.

(10) Patent No.: US 10,234,214 B2
(45) Date of Patent: Mar. 19, 2019

(54) HEAT STORAGE BODY

(71) Applicant: TYK CORPORATION, Tokyo (JP)

(72) Inventors: Osamu Takagi, Tajimi (JP); Shuichi Adachi, Tajimi (JP)

(73) Assignee: TVK CORPORATION, Tokyo (JP)

( * ) Notice: Subject to any disclaimer, the term of this patent is extended or adjusted under 35 U.S.C. 154(b) by 0 days.

(21) Appl. No.: 15/541,632

(22) PCT Filed: Jul. 29, 2016

(86) PCT No.: PCT/JP2016/072321
§ 371 (c)(1),
(2) Date: Jul. 5, 2017

(87) PCT Pub. No.: WO2017/022664
PCT Pub. Date: Feb. 9, 2017

(65) Prior Publication Data
US 2018/0135918 A1    May 17, 2018

(30) Foreign Application Priority Data

Aug. 5, 2015   (JP) .................................. 2015-154986
Jun. 27, 2016  (JP) .................................. 2016-126540

(51) Int. Cl.
*B23P 15/26*    (2006.01)
*F28D 20/00*    (2006.01)
*F28F 21/04*    (2006.01)

(52) U.S. Cl.
CPC .......... *F28D 20/0056* (2013.01); *B23P 15/26* (2013.01); *F28F 21/04* (2013.01); *Y02E 60/142* (2013.01)

(58) Field of Classification Search
CPC ...... F28D 20/0056; F28D 20/00; F28D 19/04; B23P 15/26; Y02E 60/142; Y02E 60/14
(Continued)

(56) References Cited

U.S. PATENT DOCUMENTS 4,170,982 A  * 10/1979  Gottier .................. F24H 7/0458
                                                          110/304
4,392,531 A  *  7/1983  Ippolito .................. E21B 43/04
                                                          166/278

(Continued)

FOREIGN PATENT DOCUMENTS

JP    S62-234527 A    10/1987
JP    H8-068597 A     3/1996
(Continued)

OTHER PUBLICATIONS

International Search Report for International Patent Application No. PCT/JP2016/072321 dated Oct. 25, 2016.

*Primary Examiner* — Justin M Jonaitis
(74) *Attorney, Agent, or Firm* — Kenichiro Yoshida

(57) ABSTRACT

A circular columnar body made of ceramics and including a plurality of through-holes extending in a single axial direction Z and having circular or elliptical cross sectional shapes orthogonal to the axial direction at a density of 2 to 50 pieces per square inch in a cross section orthogonal to the axial direction is once hollowed out in a direction X orthogonal to the axial direction Z by a cylinder, and the circular columnar body can also be once again hollowed out in the direction orthogonal to the axial direction Z and the direction X by the cylinder.

6 Claims, 13 Drawing Sheets

(58) Field of Classification Search
USPC .............................................. 165/10, 6, 902
See application file for complete search history.

(56) References Cited

U.S. PATENT DOCUMENTS

| | | | |
|---|---|---|---|
| 5,161,517 A * | 11/1992 | Johansson | A21B 1/26 |
| | | | 126/20 |
| 5,441,097 A * | 8/1995 | Kanda | F28D 20/0034 |
| | | | 165/10 |
| D827,114 S * | 8/2018 | Takagi | D23/329 |
| 2008/0128121 A1* | 6/2008 | Zhou | F27D 1/042 |
| | | | 165/133 |
| 2016/0161132 A1* | 6/2016 | Kuo | F24F 5/0021 |
| | | | 62/438 |
| 2016/0370124 A1* | 12/2016 | Ide | F28D 20/023 |

FOREIGN PATENT DOCUMENTS

| | | |
|---|---|---|
| JP | H8-247671 A | 9/1996 |
| JP | 2002-292768 A | 10/2002 |
| JP | 2003-343829 A | 12/2003 |
| JP | 2012-228655 A | 11/2012 |

\* cited by examiner

HEAT STORAGE BODY

BACKGROUND OF THE INVENTION

Field of the Invention

The present invention relates to a heat storage body arranged on a flow path of fluid and collecting heat from the fluid.

Description of the Related Art

As an example of a heat storage body arranged on a flow path of fluid and collecting heat from the fluid, a heat storage body that is installed in a heat exchanger of a heat storage burner (regenerative burner) can be exemplified. The heat storage burner is a burner that is used in an industrial furnace such as a forging furnace, a heat treatment furnace, a melting furnace, and a baking furnace, and a gas flow direction therein is switched at a predetermined time interval in order to alternately flow, to the heat exchanger, exhaust gas increased in temperature due to combustion of the burner and gas to be newly supplied for combustion of the burner. The heat storage body collects heat from the exhaust gas and the gas to be newly supplied is preheated with the collected heat.

A large number of heat storage bodies are loaded in the heat exchanger of the heat storage burner, and solid balls made of alumina (referred to as "alumina ball") have been widely used as the heat storage bodies conventionally (for example, see Japanese Patent Application Laid-open No. 2003-343829). When the solid heat storage bodies are loaded, gas flow through spaces between the heat storage bodies, resulting in the problem that pressure loss is increased. Furthermore, the areas of the solid bodies making contact with the fluid are small because they have small specific surface areas, and center portions of the solid bodies are difficult to contribute to heat exchange. These cause the problem of insufficient heat exchange.

Meanwhile, a technique of using a honeycomb structure made of ceramics such as alumina, cordierite, and mullite as the heat storage body for the heat storage burner has been also proposed (for example, see Japanese Patent Application Laid-open No. 8-247671). The honeycomb structure has the advantage that pressure loss with flow of gas is small because it includes cells partitioned by a plurality of separation walls and the cells extend in a single direction. Furthermore, the honeycomb structure has the advantage that the area thereof making contact with fluid is extremely large because the specific surface area thereof is extremely large.

However, what the specific surface area of the honeycomb structure is extremely large indicates that the mass thereof is extremely smaller than that of the solid heat storage body having the same degree of bulkiness and a heat capacity thereof is small. For this reason, in the conventional heat storage body having the honeycomb structure, time until a heat storage amount is saturated is too short in some cases depending on conditions under which the heat storage body is used, such as the temperature of fluid for heat exchange, applications of a device using the heat storage body, and the like. That is to say, the specific surface area is desirably large for heat exchange whereas a heat storage body having a larger heat capacity than that of the conventional heat storage body having the honeycomb structure is requested in some cases.

In the case in which the heat storage bodies have spherical shapes like the conventional alumina balls, when the heat storage bodies are arranged in the heat exchanger, the heat storage bodies roll to be loaded such that a dead space is decreased by throwing the heat storage bodies into the heat exchanger through an opening of its casing, thereby making an operation easy. By contrast, the honeycomb structure is formed by extrusion molding and is therefore made into a columnar form having a single cross-sectional shape. Therefore, when the honeycomb structures are fed into the heat exchanger by being thrown, a dead space (spaces between the honeycomb structures) is increased. For avoiding this situation, the conventional heat storage bodies having the honeycomb structures are stacked so as not to generate the dead space while the honeycomb structures are formed into cubic shapes or rectangular parallelepiped shapes, resulting in an extremely troublesome operation of stacking a large number of honeycomb structures.

For these reasons, conventionally, the alumina balls tend to be selected while giving precedence on easiness of the loading operation by throwing even with the disadvantage of the insufficient heat exchange.

SUMMARY OF THE INVENTION

In consideration of the above-described circumferences, an object of the present invention is to provide a heat storage body capable of adjusting a specific surface area and a heat capacity and being fed into the heat exchanger easily while reducing a dead space.

In order to achieve the above-described object, there is provided a heat storage body according to an aspect of the present invention "which is made of ceramics, the heat storage body including:

a plurality of through-holes extending in a single axial direction and having circular or elliptical cross sectional shapes orthogonal to the axial direction at a density of 2 to 50 pieces per square inch in a cross section orthogonal to the axial direction, wherein an outer shape(s) when seen from one direction, two directions, or three directions is(are) a circular shape(s) when opposing directions are regarded as the same direction, and a cylinder inscribed face as a curved face inscribed in a single virtual cylinder is provided on at least a part of each of opened end faces as end surfaces in which the plurality of through-holes are opened and the number of cylinder inscribed face(s) is one or two per one opened end face when being counted while the cylinder inscribed faces inscribed in the cylinders having the same center axis are regarded as the same face."

A material of the "heat storage body made of ceramics" is not particularly limited and may be silicon carbide, aluminum titanate, alumina, mullite, cordierite, or the like.

What the "opposing directions are regarded as the same direction" indicates that two directions having sight lines on the same line with opposite orientations, such as two directions in a front view and a rear view, two directions in a plan view and a bottom view, and two directions in a left side view and a right side view, are regarded as the same direction.

The shape that "an outer shape(s) when seen from one direction, or two directions is(are) a circular shape(s) when opposing directions are regarded as the same direction, and a cylinder inscribed face as a curved face inscribed in a single virtual cylinder is provided on at least a part of each of opened end faces as end surfaces in which the plurality of through-holes are opened" can be made of a circular columnar body in which the plurality of through-holes are formed in the axial direction and formed by once hollowing out the circular columnar body in the direction orthogonal to the axial direction by a cylinder. In this case, the direction in which the outer shape is seen to be the circular shape is one direction or two directions based on a relation between the diameter and the height of the circular columnar body as a base and the diameter of the cylinder that is used for hollowing out it. Furthermore, one cylinder inscribed face is formed for one opened end surface in the direction in which the circular columnar body is hollowed out by the cylinder.

Furthermore, another cylinder inscribed face is formed for one opened end face by once again hollowing out the circular columnar body, by the cylinder, in the direction orthogonal to the axial direction and orthogonal to the direction in which the circular columnar body has been previously hollowed out by the cylinder as described above. With this, the heat storage body having the "two cylinder inscribed faces for one opened end face" is formed. In this case, the direction in which the outer shape is seen to be the circular shape is "one direction, two directions, or three directions" based on the relation between the diameter and the height of the circular columnar body as the base and the diameter of the cylinder that is used for hollowing out it.

The heat storage body having this configuration has the circular outer shape(s) when seen from one direction, two directions, or three directions and is therefore easy to roll in the circumferential direction(s) thereof. Furthermore, one or two curved face(s) for one opened end face is(are) provided on at least a part of the opened end faces and each curved face is the cylinder inscribed face inscribed in the single virtual cylinder. Therefore, the heat storage body is easy to roll in the circumferential direction thereof. That is to say, the heat storage body having this configuration has such a shape that it is extremely easy to roll. Accordingly, even when the plurality of heat storage bodies are fed by such a rough manner as throwing into an installation place, the individual heat storage bodies roll and are easy to be densely loaded spontaneously, thereby arranging them while reducing a dead space with an easy operation.

The specific surface area and the heat capacity of the heat storage body having this configuration can be adjusted with the number and the diameter of through-holes. The density of the through-holes in the cross section of the heat storage body in the direction orthogonal to the axial direction of the through-holes is 2 to 50 pieces per square inch, that is, 0.3 to 8 pieces per square centimeter. This density is lower than a cell density (in general, 200 to 500 cells per square inch) of the conventional heat storage body having the honeycomb structure by a single digit to double digits. The specific surface area and the heat capacity can be supposed to be adjusted by changing the cell density of the honeycomb structure. In this case, both of these values can be changed only in a range in which the specific surface area is extremely large and the heat capacity is extremely small. By contrast, the specific surface area and the heat capacity can be easily adjusted in a range in which the heat capacity is much larger than that of the conventional honeycomb structure by setting the density of the through-holes in the cross section orthogonal to the axial direction to 2 to 50 pieces per square inch.

Furthermore, in the heat storage body having this configuration, the through-holes have the circular or elliptical cross sectional shapes orthogonal to the axial direction. Therefore, thick portions are formed between the through-holes to increase the strength as a whole. Accordingly, the heat storage body has the advantage that it is difficult to be damaged even when the heat storage body is fed by such a rough manner as throwing into an installation place.

Furthermore, fluid with which the heat storage body is caused to exchange heat contains contaminants in some cases. For example, in a heating furnace for melting metal directly by heating, exhaust gas contains residue of sodium compound, potassium compound, or calcium compound that is added for adjusting the easiness of melting whereas in a metal scrap melting furnace, exhaust gas contains dusts derived from scrap. In these cases, if the through-holes of the heat storage body have shapes with corner portions, the contaminants are easy to be caught by the corner portions and the through-holes are easy to be clogged with the contaminants when the fluid passes therethrough. On the other hand, the heat storage body having this configuration has the advantage that the through-holes are difficult to be clogged with contaminants even when the fluid contains the contaminants because the through-holes have the circular or elliptical cross sectional shapes.

The heat storage body in the aspect of the invention can have the characteristics that "one opened end face is formed only by one or two cylinder inscribed face(s)" in the above-described configuration.

In the heat storage body having this configuration, the opened end face is formed only by "a cylinder inscribed face as a curved face inscribed in a single virtual cylinder". Therefore, the heat storage body has a shape making it easier to roll than the shape that the cylinder inscribed face is provided on a part of the opened end face.

The heat storage body in the aspect of the invention can have the characteristics that "the outer shapes when seen from the two directions are the circular shapes" in the above-described configuration.

In the heat storage body having this configuration, the outer shapes when seen from two different directions are the circular shapes and the heat storage body is easy to roll in the respective circumferential directions thereof. Accordingly, the heat storage body has a shape making it easier to roll than the heat storage body of which the outer shape is the circular shape only when seen from one direction.

The heat storage body in the aspect of the invention can have the characteristics that "the outer shapes when seen from the three directions are the circular shapes, and one opened end face is formed only by the two cylinder inscribed faces" in the above-described configuration.

In the heat storage body having this configuration, the outer shapes when seen from different three directions are the circular shapes. Therefore, the heat storage body has a shape making it much easier to roll than the heat storage body of which the outer shape(s) is(are) the circular shapes only when seen from one or two directions. In addition, not only the heat storage body is easier to roll than the shape that the cylinder inscribed face is provided on a part of the opened end face because the opened end face is formed only by the cylinder inscribed face but also the heat storage body can roll in both of the two circumferential directions because one opened end face is formed by the two cylinder inscribed faces.

A method for manufacturing a heat storage body according to another aspect of the invention "includes once hollowing out a circular columnar body, which is made of ceramics and including a plurality of through-holes extending in a single axial direction and having circular or elliptical cross sectional shapes orthogonal to the axial direction at a density of 2 to 50 pieces per square inch in a cross section orthogonal to the axial direction, in a direction orthogonal to the axial direction, by a cylinder."

This method is a method for manufacturing the heat storage body having the above-described configuration, that is, the heat storage body "which is made of ceramics, the heat storage body including:

a plurality of through-holes extending in a single axial direction and having circular or elliptical cross sectional shapes orthogonal to the axial direction at a density of 2 to 50 pieces per square inch in a cross section orthogonal to the axial direction, wherein an outer shape(s) when seen from one direction or two directions is(are) a circular shape(s) when opposing directions are regarded as the same direction, and a cylinder inscribed face as a curved face inscribed in a single virtual cylinder is provided on at least a part of each of opened end faces as end surfaces in which the plurality of through-holes are opened and the number of cylinder inscribed face is one per one opened end face when being counted while the cylinder inscribed faces inscribed in the cylinders having the same center axis are regarded as the same face."

The method for manufacturing the heat storage body in the aspect of the invention can further include "once again hollowing out, by the cylinder, the circular columnar body in a direction orthogonal to the axial direction and orthogonal to the direction in which the circular columnar body has been previously hollowed out by the cylinder" in addition to the above-described configuration.

This method is a method for manufacturing the heat storage body having the above-described configuration, that is, the heat storage body "which is made of ceramics, the heat storage body including:

a plurality of through-holes extending in a single axial direction and having circular or elliptical cross sectional shapes orthogonal to the axial direction at a density of 2 to 50 pieces per square inch in a cross section orthogonal to the axial direction, wherein an outer shape(s) when seen from one direction, two directions, or three directions is(are) a circular shape(s) when opposing directions are regarded as the same direction, and a cylinder inscribed face as a curved face inscribed in a single virtual cylinder is provided on at least a part of each of opened end faces as end surfaces in which the plurality of through-holes are opened and the number of cylinder inscribed faces are two per one opened end face when being counted while the cylinder inscribed faces inscribed in the cylinders having the same center axis are regarded as the same face."

As described above, as an effect of the present invention, a heat storage body capable of adjusting a specific surface area and a heat capacity and being fed into the heat exchanger easily while reducing a dead space.

DESCRIPTION OF THE EMBODIMENTS

Figure 1A:
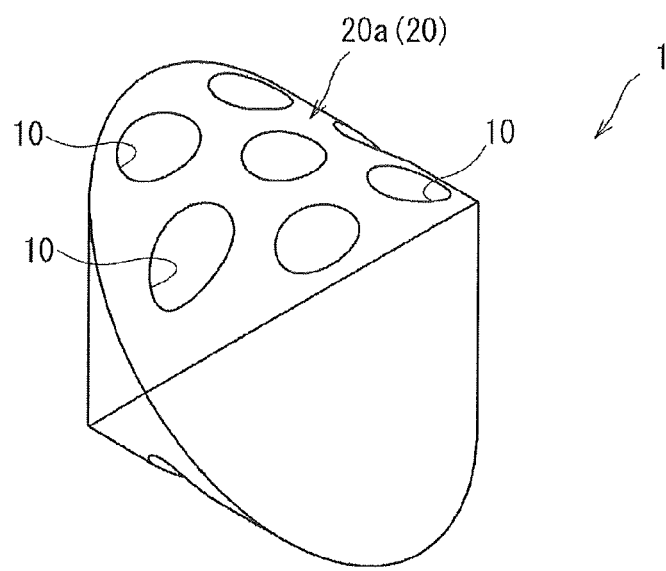
FIG. 1A is a perspective view of a heat storage body as a first embodiment of the invention.

Hereinafter, a heat storage body 1 according to a first embodiment of the invention to a heat storage body 8 according to an eighth embodiment thereof will be described. Each of the heat storage bodies 1 to 8 has a plurality of through-holes 10 extending in a single axial direction and having circular cross sectional shapes orthogonal to the axial direction. Furthermore, outer shape(s) of each of the heat storage bodies 1 to 8 when seen from one direction, two directions, or three directions is(are) a circular shape(s) when opposing directions are regarded as the same direction and a cylinder inscribed face 20a as a curved surface inscribed in a single virtual cylinder is provided on at least a part of each of opened end faces 20 as end surfaces in which the plurality of through-holes 10 are opened.

The respective drawings illustrate the opened end face 20 in which the through-holes 10 are opened so as to be observed in a plan view. Hereinafter, a simply referred "axial direction" indicates the axial direction of the through-holes 10.

First, the heat storage bodies 1 to 4 in the first embodiment to the fourth embodiment will be described. In each of the heat storage bodies 1 to 4, the number of cylinder inscribed face 20a is one per one opened end face 20 when being counted while the cylinder inscribed faces 20a inscribed in cylinders having the same center axis are regarded as the same face.

Figure 1B:
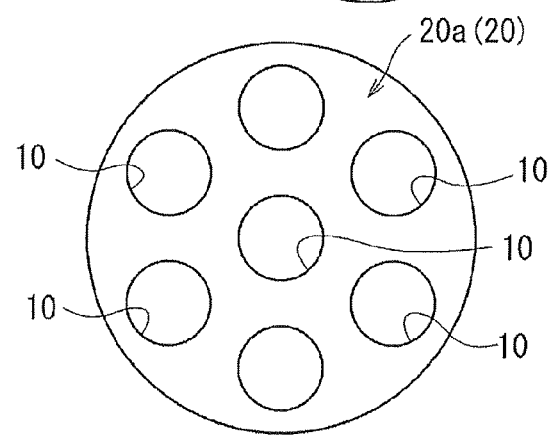
FIG. 1B is a plan view thereof.
Figure 1C:
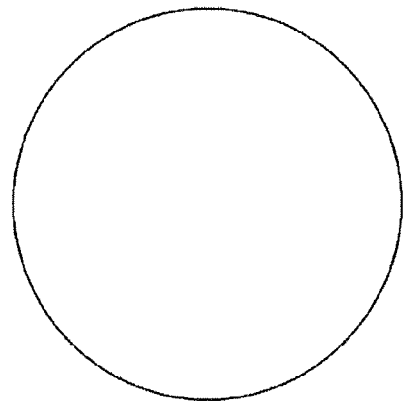
FIG. 1C is a side view thereof.

As illustrated in FIGS. 1A to 1C, the outer shapes of the heat storage body 1 in the first embodiment when seen from two directions are circular shapes and one opened end face 20 is formed only by one cylinder inscribed face 20a. To be more specific, in the heat storage body 1, an outer shape (plan view) of each opened end face 20 in which the through-holes 10 are opened is a circular shape, and an outer shape of the heat storage body 1 when seen from one of the directions orthogonal to the axial direction is a circular shape having the same diameter as that of the contour circle of each opened end face 20. When the direction in which the heat storage body 1 is seen to have the circular outer shape other than the outer shape of each opened end face 20 is assumed to be the direction in a side view, an outer shape thereof in a front view (rear view) is a regular square shape having the length of one side of which is equal to the diameter of the contour circle of each opened end face 20 and the diameter of the circle in the side view.

In the embodiment, seven through-holes 10 are illustrated in the drawings as an example. A density of the through-holes 10 in the cross section orthogonal to the axial direction is in a range of 2 to 50 pieces per square inch and the density is set in the same manner also in other embodiments.

Figure 2:
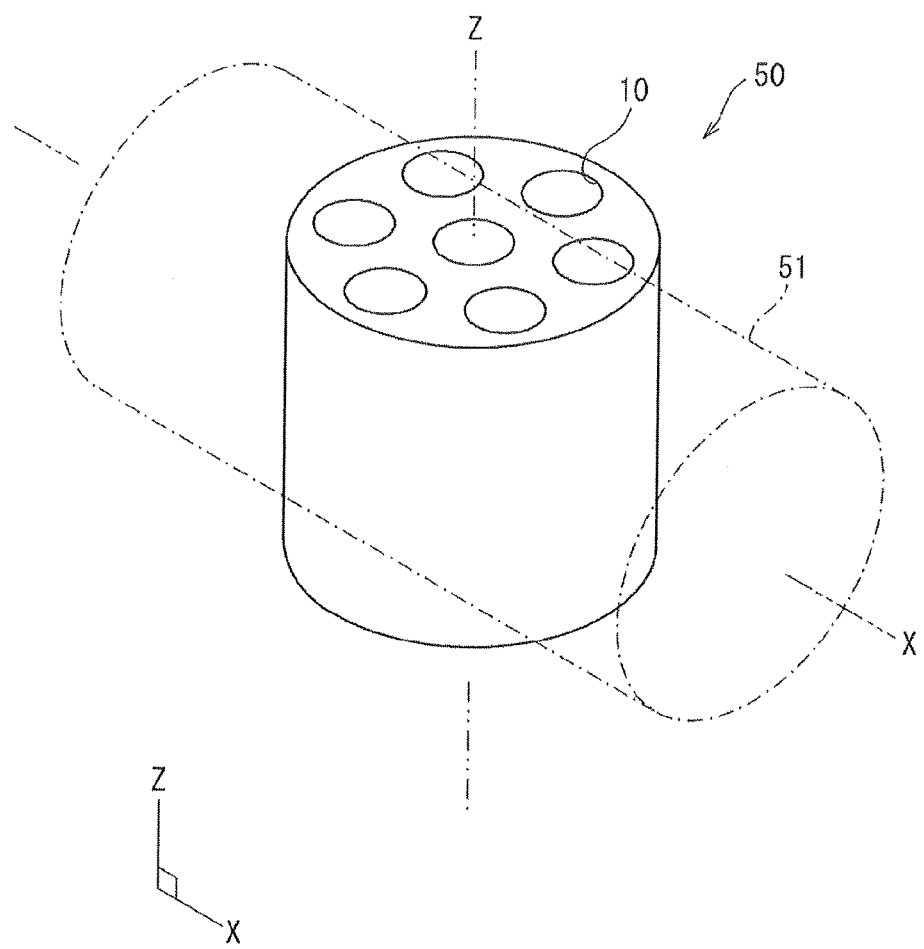
FIG. 2 is a descriptive view for explaining a method for manufacturing a heat storage body in FIGS. 1A to 1C.

The heat storage body 1 having this configuration can be formed from a circular columnar body 50 having the plurality of through-holes 10 extending in a single axial direction Z, as illustrated in FIG. 2. To be specific, the heat storage body 1 can be manufactured by once hollowing out the circular columnar body 50, of which a height is equal to or larger than a diameter of a cross-sectional circle thereof, in a direction X orthogonal to the axial direction Z by a cylinder 51 having a diameter which is equal to that of the circular columnar body 50 such that the center axis of the circular columnar body 50 and the center axis of the cylinder 51 intersect with each other. The cylinder inscribed face 20a is formed along the direction X in which the circular columnar body 50 is hollowed out by hollowing out it by the cylinder 51 in the above-described manner. That is to say, the cylinder 51 that is used for hollowing out the circular columnar body 50 in manufacturing of the heat storage body corresponds to the "single virtual cylinder in which the curved face of the opened end face of the heat storage body is inscribed" in the invention. One cylinder inscribed face 20a is formed for one opened end face 20 by once hollowing out the circular columnar body 50 in the direction X by the cylinder.

It should be noted that the circular columnar body 50 having the plurality of through-holes 10 extending in the single axial direction is made of ceramics and can be formed by extrusion molding.

Figure 3A:
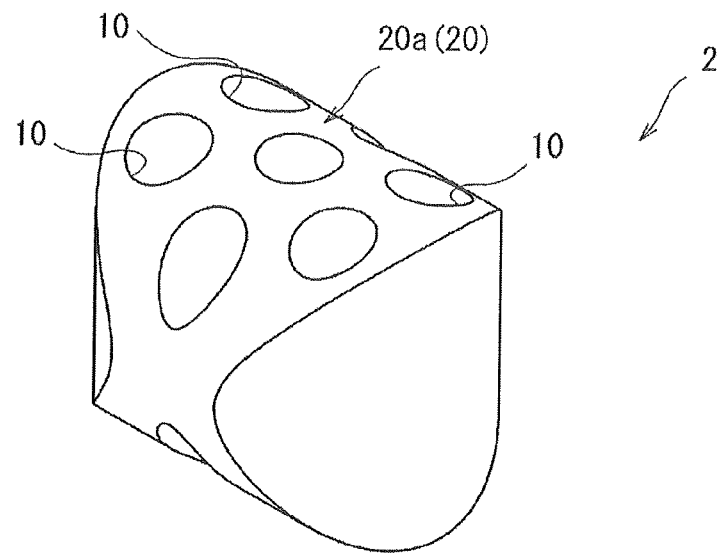
FIG. 3A is a perspective view of a heat storage body as a second embodiment of the invention.
Figure 3B:
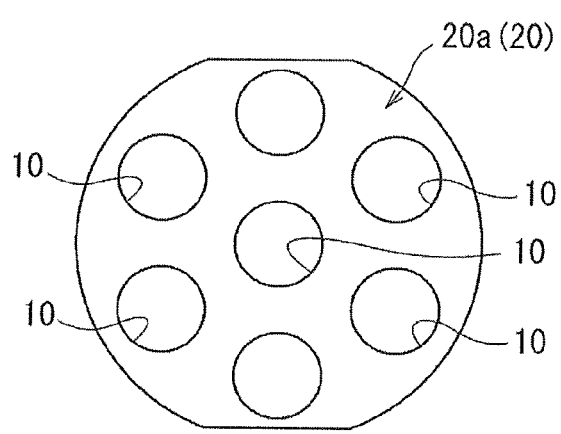
FIG. 3B is a plan view thereof.
Figure 3C:
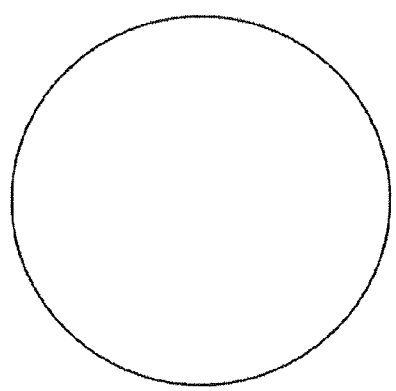
FIG. 3C is a side view thereof.

As illustrated in FIGS. 3A to 3C, the outer shape of the heat storage body 2 in the second embodiment when seen from one direction is a circular shape and one opened end face 20 is formed only by one cylinder inscribed face 20a. To be more specific, the outer shape of the heat storage body 2 when seen from one of the directions orthogonal to the axial direction is the circular shape. An outer shape of each opened end face 20 is a shape formed by cutting out upper and lower portions of a circle having a diameter larger than that of the circle in parallel in a plan view. When the direction in which the heat storage body 2 is seen to have the circular outer shape is assumed to be the direction in a side view, an outer shape thereof in a front view is a rectangular shape having the length of shorter sides, which is equal to the diameter of the circle in the side view, and the length of longer sides, which is equal to the diameter of the cutout circle of each opened end face 20 (plan view).

The heat storage body 2 having this configuration can be manufactured by once hollowing out a circular columnar body, which has the plurality of through-holes 10 extending in the single axial direction, in the direction orthogonal to the axial direction by a cylinder having a diameter which is equal to or smaller than the height of the circular columnar body and is smaller than the diameter of a cross-sectional circle of the circular columnar body such that the center axis of the circular columnar body and the center axis of the cylinder intersect with each other. The cylinder that is used for hollowing out the circular columnar body has the same diameter as that of the circle in the side view and the cross-sectional circle of the circular columnar body has the same diameter as that of the cutout circle as the outer shape of each opened end face 20.

Figure 4A:
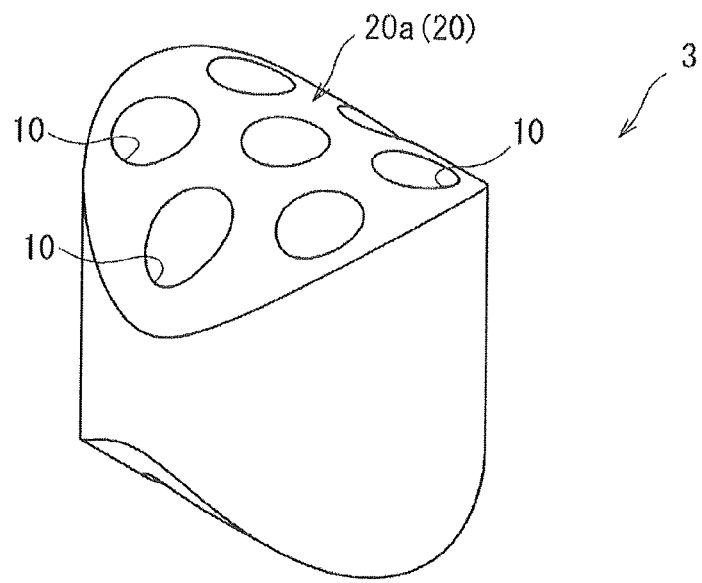
FIG. 4A is a perspective view of a heat storage body as a third embodiment of the invention.
Figure 4B:
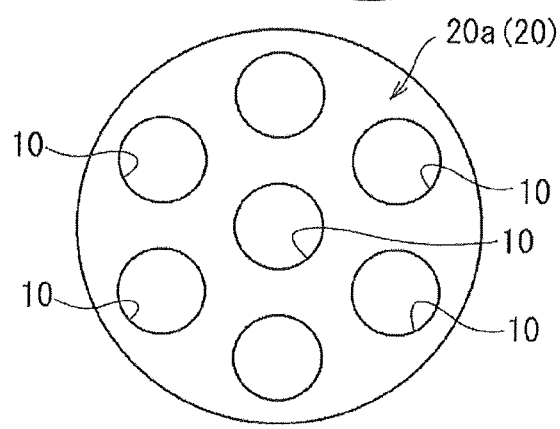
FIG. 4B is a plan view thereof.
Figure 4C:
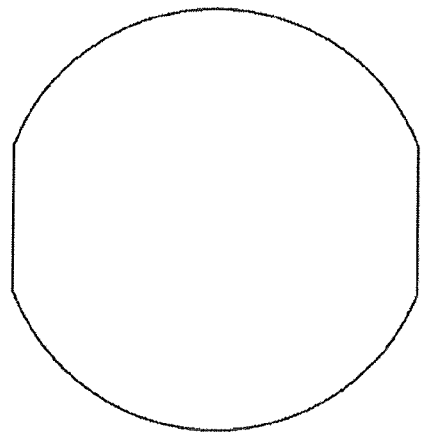
FIG. 4C is a side view thereof.

As illustrated in FIGS. 4A to 4C, the outer shape of the heat storage body 3 in the third embodiment when seen from one direction is a circular shape and one opened end face 20 is formed only by one cylinder inscribed face 20a. To be more specific, in the heat storage body 3, an outer shape of each opened end face 20 (plan view) is a circular shape, and an outer shape of the heat storage body 3 when seen from one of the directions orthogonal to the axial direction is a shape formed by cutting out a circle having a diameter larger than that of the contour circle of each opened end face 20 in parallel with the axial direction. When the direction in which the heat storage body 3 is seen to have the outer shape of the cutout circle is assumed to be the direction in a side view, an outer shape thereof in a front view is a rectangular shape having the length of shorter sides, which is equal to the diameter of the contour circle of each opened end face 20, and the length of longer sides, which is equal to the diameter of the cutout circle in the side view.

The heat storage body 3 having this configuration can be manufactured by once hollowing out a circular columnar body, which has the plurality of through-holes 10 extending in the single axial direction, in the direction orthogonal to the axial direction by a cylinder having a diameter which is equal to or smaller than the height of the circular columnar body and is larger than the diameter of a cross-sectional circle of the circular columnar body such that the center axis of the circular columnar body and the center axis of the cylinder intersect with each other. The cylinder that is used for hollowing out the circular columnar body has the same diameter as that of the cutout circle in the side view and the cross-sectional circle of the circular columnar body has the same diameter as that of the contour circle of each opened end face 20.

Figure 5A:
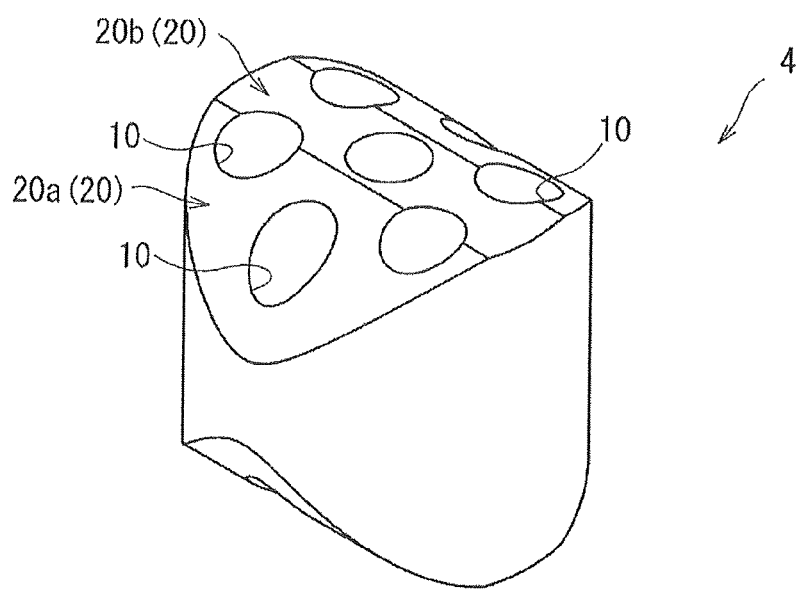
FIG. 5A is a perspective view of a heat storage body as a fourth embodiment of the invention.
Figure 5B:
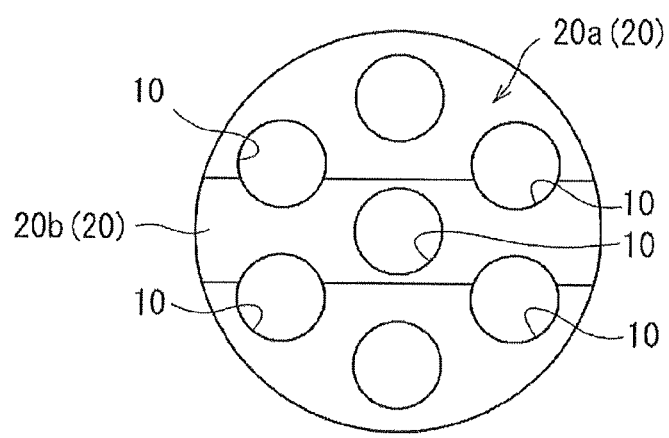
FIG. 5B is a plan view thereof.
Figure 5C:
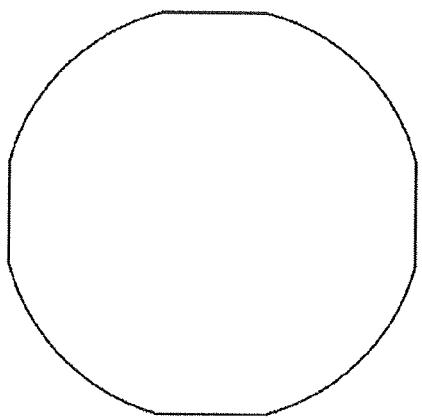
FIG. 5C is a side view thereof.

As illustrated in FIGS. 5A to 5C, the outer shape of the heat storage body 4 in the fourth embodiment when seen from one direction is a circular shape and one opened end face 20 is formed by one cylinder inscribed face 20a and one flat face 20b. To be more specific, in the heat storage body 4, an outer shape of each opened end face 20 is a circular shape, and an outer shape of the heat storage body 4 when seen from one of the directions orthogonal to the axial direction is a shape formed by cutting out a circle having a diameter larger than that of the contour circle of each opened end face 20 in parallel with the axial direction and the direction orthogonal to the axial direction. When the direction in which the heat storage body 4 is seen to have the outer shape of the cutout circle is assumed to be the direction in a side view, an outer shape thereof in a front view is a rectangular shape having the length of shorter sides, which is equal to the diameter of the contour circle of each opened end face 20, and the length of longer sides, which is equal to the diameter of the cutout circle in the side view. Furthermore, each opened end face 20 of the heat storage body 4 has a shape that the cylinder inscribed face 20a extends at each of the upper and lower sides of the flat face 20b in the plan view but the number of cylinder inscribed faces 20a is counted as one per one opened end face 20 because cylinders in which these cylinder inscribed faces 20a are inscribed have the same center axis.

The heat storage body 4 having this configuration can be manufactured by once hollowing out a circular columnar body, which has the plurality of through-holes 10 extending in the single axial direction, in the direction orthogonal to the axial direction by a cylinder having a diameter which is larger than the height and the diameter of a cross-sectional circle of the circular columnar body such that the center axis of the circular columnar body and the center axis of the cylinder intersect with each other. The cylinder that is used for hollowing out the circular columnar body has the same diameter as that of the cutout circle in the side view and the cross-sectional circle of the circular columnar body has the same diameter as that of the contour circle of each opened end face 20.

Figure 6:
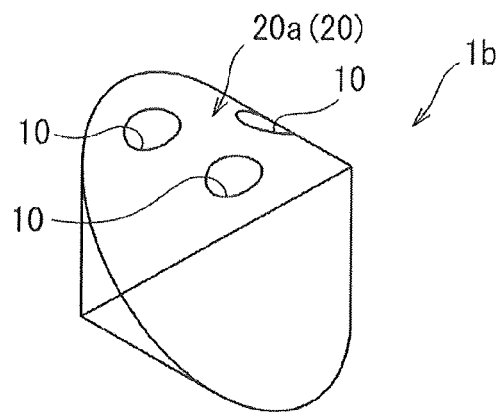
FIG. 6 is a perspective view of a heat storage body as a variation of the first embodiment.
Figure 7A:
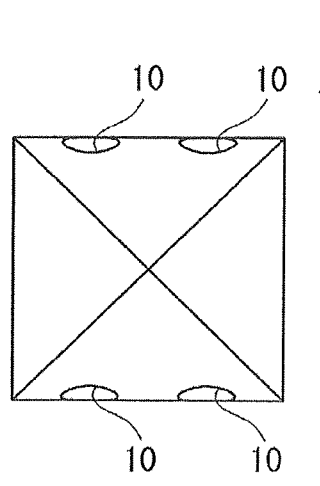
FIG. 7A is a front view of the heat storage body in FIG. 6
Figure 7B:
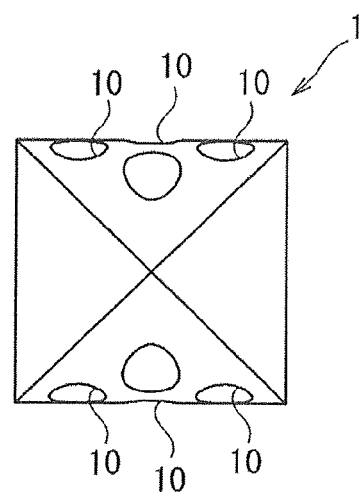
FIG. 7B is a front view of the heat storage body in FIGS. 1A to 1C.
Figure 8A:
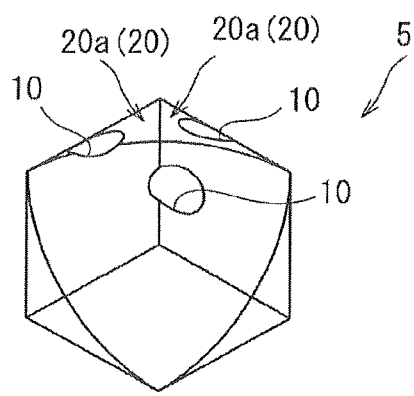
FIG. 8A is a perspective view of a heat storage body as a fifth embodiment of the invention.
Figure 8B:
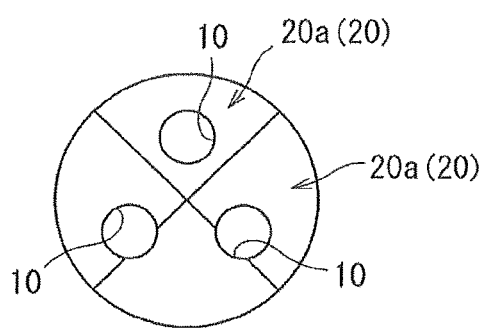
FIG. 8B is a plan view thereof.
Figure 8C:
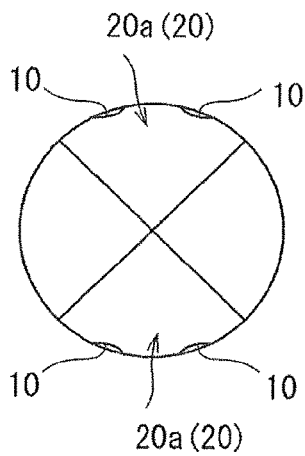
FIG. 8C is a front view thereof.
Figure 8D:
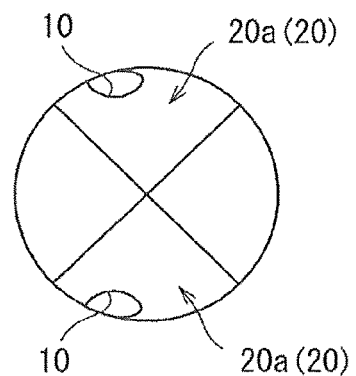
FIG. 8D is a side view thereof.

When the shape formed by hollowing out the circular columnar body by the cylinder is expressed by the shape in the plan view, the side view, or the front view, contour lines of the edges of the through-holes 10 are neglected in order to eliminate influence by differences in the number and positions of through-holes 10. For example, a heat storage body 1b as a variation of the first embodiment illustrated in FIG. 6 is the same as the heat storage body 1 in the first embodiment other than the number of through-holes 10. That is to say, as for the through-holes 10 of the heat storage body 1, one through-hole 10 is formed on the center axis of the circular columnar body as the base and the other six through-holes 10 are provided at equal angular intervals with respect to the center axis of the circular columnar body. By contrast, as for the through-holes 10 of the heat storage body 1b, three through-holes 10 are provided at equal angular intervals with respect to the center axis of the circular columnar body as the base. As illustrated in FIG. 7A, the contours of the through-holes 10 give no influence on the outer shape of the heat storage body 1b in the front view whereas as illustrated in FIG. 7B, the outer shape of the heat storage body 1 in the front view is recessed on portions corresponding to the through-hole 10 on the center axis. In this specification, the contour lines of the edges of the through-holes 10 are not taken into consideration for expression and the outer shape in FIG. 7B is also expressed as a "regular square shape" in the same manner as the outer shape in FIG. 7A.

Next, the heat storage bodies 5 to 8 in the fifth embodiment to the eighth embodiment will be described. In each of the heat storage bodies 5 to 8, the number of cylinder inscribed faces 20a are two per one opened end face 20 when being counted while the cylinder inscribed faces 20a inscribed in cylinders having the same center axis are regarded as the same face.

As illustrated in FIGS. 8A to 8D, the outer shapes of the heat storage body 5 in the fifth embodiment when seen from three directions are circular shapes and one opened end face 20 is formed only by two cylinder inscribed faces 20a. To be more specific, in the heat storage body 5, an outer shape of each opened end face 20 (plan view) in which the through-holes 10 are opened is a circular shape, and outer shapes of the heat storage body 5 from two directions orthogonal to the axial direction, that is, the outer shapes thereof in a front view and a side view are circular shapes having the same diameter as that of the contour circle of each opened end face 20. It should be noted that three through-holes 10 are illustrated in the drawing, as an example.

Figure 9:
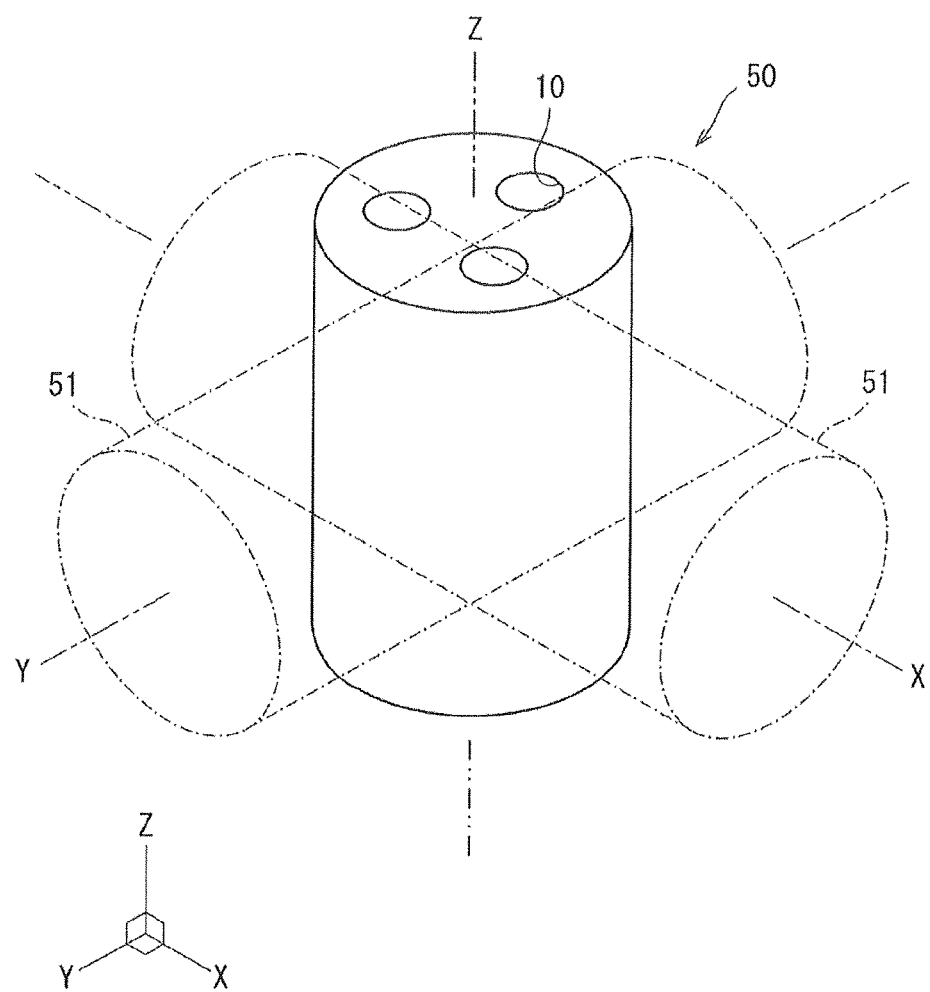
FIG. 9 is a descriptive view for explaining a method for manufacturing the a heat storage body in FIGS. 8A to 8D.
Figure 10A:
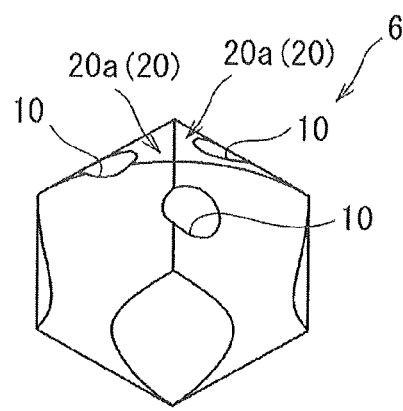
FIG. 10A is a perspective view of a heat storage body as a sixth embodiment of the invention.
Figure 10B:
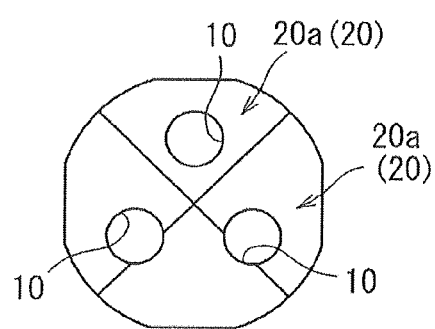
FIG. 10B is a plan view thereof.
Figure 10C:
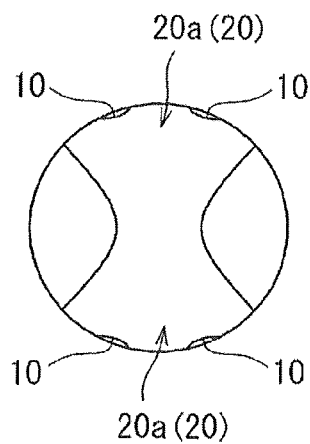
FIG. 10C is a front view thereof.
Figure 10D:
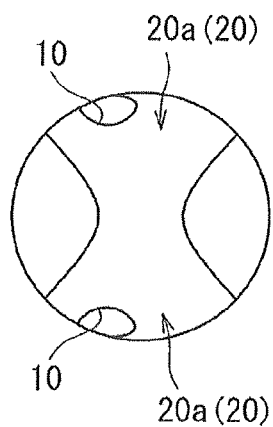
FIG. 10D is a side view thereof.
Figure 11A:
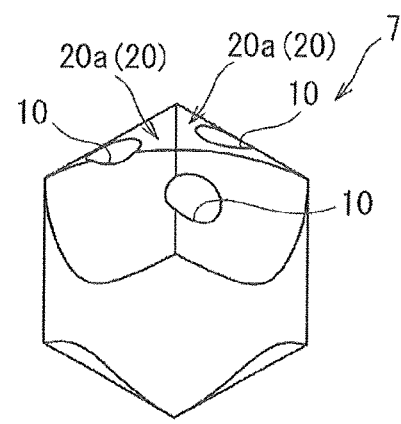
FIG. 11A is a perspective view of a heat storage body as a seventh embodiment of the invention.
Figure 11B:
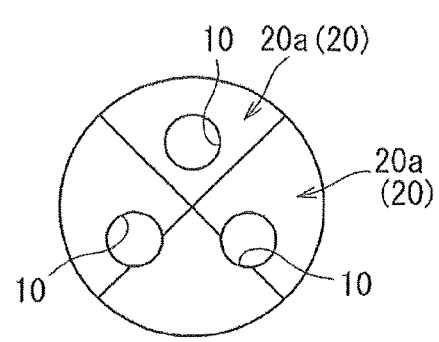
FIG. 11B is a plan view thereof.
Figure 11C:
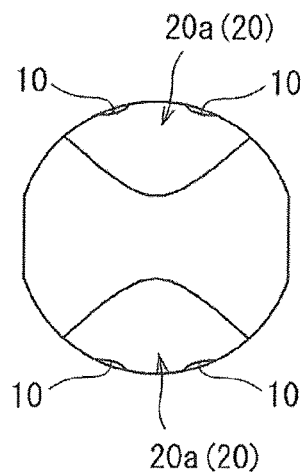
FIG. 11C is a front view thereof.
Figure 11D:
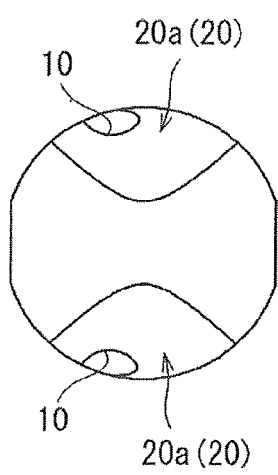
FIG. 11D is a side view thereof.
Figure 12A:
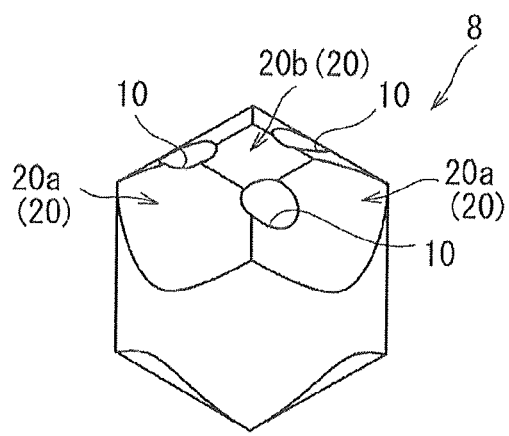
FIG. 12A is a perspective view of a heat storage body as an eighth embodiment of the invention.
Figure 12B:
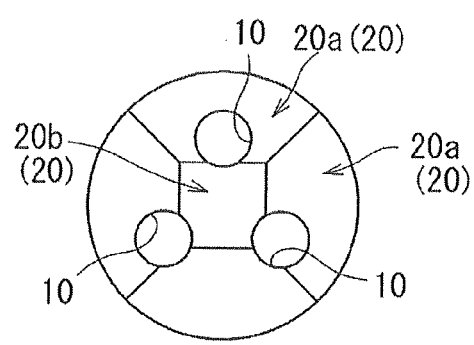
FIG. 12B is a plan view thereof.
Figure 12C:
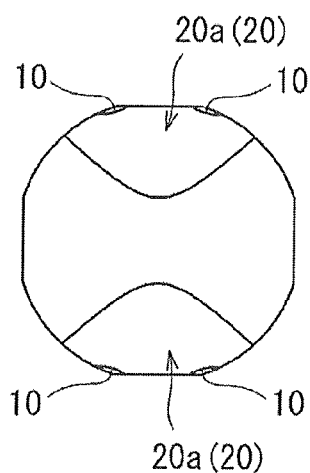
FIG. 12C is a front view thereof.
Figure 12D:
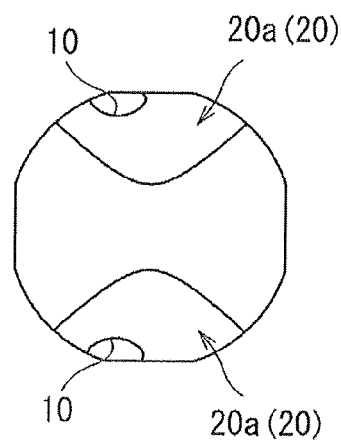
FIG. 12D is a side view thereof.

As illustrated in FIG. 9, the heat storage body 5 having this configuration can be formed from the circular columnar body 50 having the plurality of through-holes 10 extending in the single axial direction Z and made of ceramics. To be specific, the heat storage body 5 can be manufactured by twice hollowing out the circular columnar body 50 by the cylinder 51 in the direction X orthogonal to the axial direction Z and the direction Y orthogonal to the axial direction Z and the direction X such that the center axis of the circular columnar body 50 and the center axis of the cylinder 51 intersect with each other. The circular columnar body 50 has a height which is equal to or larger than a diameter of a cross-sectional circle thereof and the cylinder 51 has a diameter which is equal to that of the circular columnar body 50. The two cylinder inscribed faces 20a are formed for one opened end face 20 by twice hollowing out the circular columnar body 50 in the direction X and the direction Y by the cylinder 51.

As illustrated in FIGS. 10A to 10D, the outer shapes of the heat storage body 6 in the sixth embodiment when seen from two directions are circular shapes and one opened end face 20 is formed only by two cylinder inscribed faces 20a. To be more specific, the outer shapes of the heat storage body 6 when seen from two directions orthogonal to the axial direction, that is, the outer shapes thereof in a front view and a side view are circular shapes. An outer shape of each opened end face 20 is a shape formed by cutting out upper and lower portions and right and left portions of a circle having a diameter larger than that of the circle in parallel in a plan view.

The heat storage body 6 having this configuration can be manufactured by twice hollowing out a circular columnar body, which has the plurality of through-holes 10 extending in the single axial direction, in the two directions orthogonal to the axial direction and orthogonal to each other by a cylinder having a diameter which is equal to or smaller than the height of the circular columnar body and is smaller than the diameter of a cross-sectional circle of the circular columnar body such that the center axis of the circular columnar body and the center axis of the cylinder intersect with each other. The cylinder that is used for hollowing out the circular columnar body has the same diameter as that of the circle in the front view and the side view and the cross-sectional circle of the circular columnar body has the same diameter as that of the cutout circle as the outer shape of each opened end face 20 (plan view).

As illustrated in FIGS. 11A to 11D, the outer shape of the heat storage body 7 in the seventh embodiment when seen from one direction is a circular shape and one opened end face 20 is formed only by two cylinder inscribed faces 20a. To be more specific, in the heat storage body 7, an outer shape of each opened end face 20 (plan view) is a circular shape, and outer shapes of the heat storage body 7 when seen from two directions orthogonal to the axial direction, that is, the outer shapes thereof in a front view and a side view are shapes formed by cutting out a circle having a diameter larger than that of the contour circle of each opened end face 20 in parallel with the axial direction.

The heat storage body 7 having this configuration can be manufactured by twice hollowing out a circular columnar body, which has the plurality of through-holes 10 extending in the single axial direction, in two directions orthogonal to the axial direction and orthogonal to each other by a cylinder having a diameter which is equal to or smaller than the height of the circular columnar body and is larger than the diameter of a cross-sectional circle of the circular columnar body such that the center axis of the circular columnar body and the center axis of the cylinder intersect with each other. The cylinder that is used for hollowing out the circular columnar body has the same diameter as those of the cutout circles in the front view and the side view and the cross-sectional circle of the circular columnar body has the same diameter as that of the outer shape of each opened end face 20.

As illustrated in FIGS. 12A to 12D, the outer shape of the heat storage body 8 in the eighth embodiment when seen from one direction is a circular shape and one opened end face 20 is formed by two cylinder inscribed faces 20a and one flat face 20b. To be more specific, in the heat storage body 8, an outer shape of each opened end face 20 (plan view) is a circular shape, and outer shapes of the heat storage body 8 when seen from two directions orthogonal to the axial direction, that is, the outer shapes thereof in a front view and a side view are shapes formed by cutting out a circle having a diameter larger than that of the contour circle of each opened end face 20 in parallel with the axial direction and the direction orthogonal to the axial direction. Furthermore, each opened end face 20 of the heat storage body 8 has a shape that the flat face 20b is surrounded by the cylinder inscribed faces 20a in the plan view and the number of cylinder inscribed faces 20a is counted as two per one opened end face 20 because there are two cylinders in which these cylinder inscribed faces 20a are inscribed and the center axes of which are orthogonal to each other.

The heat storage body 8 having this configuration can be manufactured by twice hollowing out a circular columnar body, which has the plurality of through-holes 10 extending in the single axial direction, in two directions orthogonal to the axial direction and orthogonal to each other by a cylinder having a diameter which is larger than the height and the diameter of a cross-sectional circle of the circular columnar body such that the center axis of the circular columnar body and the center axis of the cylinder intersect with each other. The cylinder that is used for hollowing out the circular columnar body has the same diameter as those of the cutout circles in the front view and the side view and the cross-sectional circle of the circular columnar body has the same diameter as that of the contour circle of each opened end face 20.

Figure 13A:
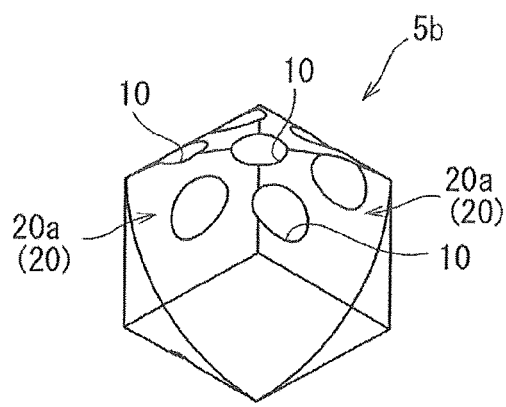
FIG. 13A is a perspective view of a heat storage body as a variation of the fifth embodiment.
Figure 13B:
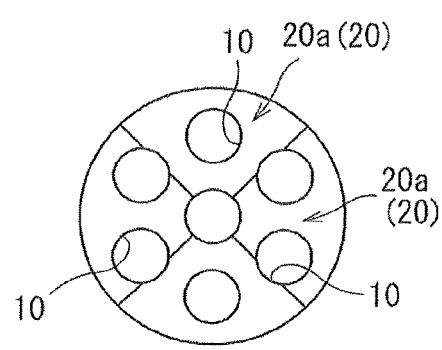
FIG. 13B is a plan view thereof.
Figure 13C:
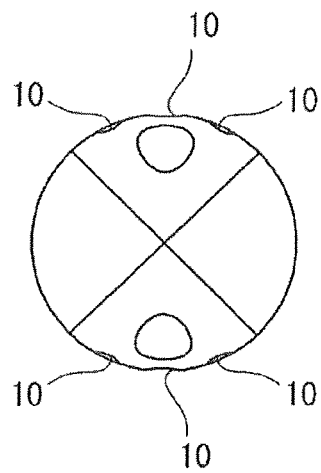
FIG. 13C is a front view thereof.
Figure 13D:
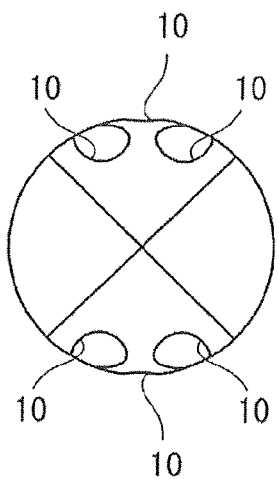
FIG. 13D is a side view thereof.

In each of the heat storage bodies 5 to 8, the contour lines of the edges of the through-holes 10 give no influence on the outer shapes in the front view and the side view. However, when the through-hole 10 is formed on the center axis of the circular columnar body that is hollowed out, the contour lines of the edges of the through-hole 10 appear on the outer shapes in the front view and the side view. For example, a heat storage body 5b as a variation of the fifth embodiment illustrated in FIGS. 13A to 13D is the same as the heat storage body 5 in the fifth embodiment other than the number of through-holes 10. In the heat storage body 5b, seven through-holes 10 are formed and one through-hole 10 is formed on the center axis of the circular columnar body that is hollowed out. In this case, as illustrated in FIGS. 13C and 13D, the outer shapes in the front view and the side view are recessed in portions corresponding to the through-hole 10 on the center axis. As described above with reference to FIGS. 7A and 7B, in this specification, the shape is expressed while the contour lines of the edges of the through-holes 10 are neglected. Therefore, both of the outer shapes in FIGS. 13C and 13D are "circular shapes".

As described above, each of the heat storage bodies 1 to 8, 1b, and 5b in the first embodiment to the eighth embodiment and the variations has the shape making it easy to roll because the outer shape(s) thereof when seen from one direction, two directions, or three directions is(are) the circular shape(s) and each opened end face 20 contains the cylinder inscribed face(s) 20a. Therefore, even when the plurality of heat storage bodies 1 to 8, 1b, and 5b are fed by such a rough manner as throwing into an installation place, the individual heat storage bodies 1 to 8, 1b, and 5b roll and are densely loaded spontaneously. Accordingly, even when the heat storage bodies as much as several hundred to several thousand pieces are arranged at the installation place, they can be arranged while reducing a dead space with an easy operation.

In particular, each of the heat storage bodies 1 to 3, 1b, 5 to 7, and 5b is easier to roll because one opened end face 20 is formed only by the cylinder inscribed face(s) 20a. Furthermore, each of the heat storage bodies 5 to 8, and 5b is easy to roll in both of the circumferential directions of the two cylinders in which the two cylinder inscribed faces 20a are inscribed because one opened end face 20 has two cylinder inscribed faces 20a.

Furthermore, the outer shapes of each of the heat storage bodies 1, 1b, and 6 when seen from the two directions are the circular shapes, and the outer shapes of each of the heat storage bodies 5 and 5b when seen from the three directions are the circular shapes. Accordingly, the heat storage bodies 1, 1b, and 6 having the circular outer shapes when seen from the two directions and the heat storage bodies 5 and 5b having the circular outer shapes when seen from the three directions in addition to the fact that one opened end face 20 is formed only by the cylinder inscribed face(s) 20a have shapes that are extremely easy to roll.

It should be noted that in each of the heat storage bodies 4 and 8, each opened end face 20 has the flat face 20b and the easiness of rolling can therefore be adjusted by changing the ratio of the cylinder inscribed face(s) 20a and the flat face 20b.

Furthermore, in each of the heat storage bodies 1 to 8, 1b, and 5b, the density of the through-holes 10 in the cross section thereof orthogonal to the axial direction is 2 to 50 pieces per square inch. Therefore, the specific surface area and the heat capacity can be adjusted by changing the number and the diameter of through-holes in a range that is largely different from that when the cell density is changed in the honeycomb structure. In particular, the specific surface area and the heat capacity can be adjusted while the heat capacity is made much larger than that of the conventional honeycomb structure.

Moreover, in each of the heat storage bodies 1 to 8, 1b, and 5b, the cross-sectional shapes of the through-holes 10 are the circular shapes and the thick portions are formed between the through-holes 10. This configuration provides the strength that each of the heat storage bodies 1 to 8, 1b, and 5b is difficult to be damaged even when it is fed by such a rough manner as throwing into an installation place. In addition, the cross-sectional shapes of the through-holes 10 are the circular shapes, thereby providing the advantage that the through-holes 10 are difficult to be clogged with contaminants in comparison with the case in which the through-holes have corner portions.

Each of the heat storage bodies 1 to 8, 1b, and 5b can be manufactured by forming the circular columnar body having the plurality of through-holes 10 by extrusion molding and once or twice hollowing out the circular columnar body in the direction(s) orthogonal to the axial direction. Accordingly, the heat storage bodies 1 to 8, 1b, and 5b can be easily manufactured without adding a special facility to a facility for manufacturing the conventional honeycomb structure.

As described above, the present invention has been described using the preferred embodiments. However, the invention is not limited to the above-described embodiments and various improvement and changes in design can be made in a range without departing from the gist of the invention, as will be described below.

For example, although the shapes of the through-holes 10 in the cross section orthogonal to the axial direction are the circular shape, as an example, in the above description, as in each of heat storage bodies 1c and 5c illustrated in FIGS. 14A, 14B, 15A, and 15B, the shapes of the through-holes 10 in the cross section may be elliptical shapes. Even when the shapes of the through-holes 10 are the elliptical shapes, in the same manner as the case in which the shapes of the through-holes 10 are the circular shapes, the above-described advantages are provided. To be specific, even in this case, each of the heat storage bodies 1c and 5c has the strength that it is difficult to be damaged even when it is fed by such a rough manner as throwing into an installation place because the thick portions are formed between the through-holes 10, and the through-holes 10 are difficult to be clogged with contaminants in comparison with the case in which the through-holes have corner portions.

Figure 14A:
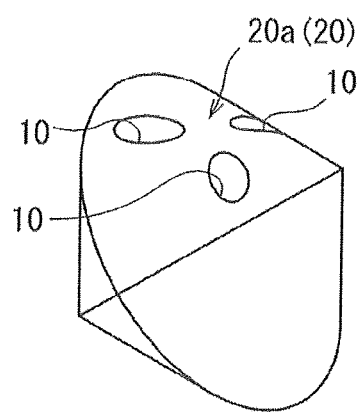
FIG. 14A is a perspective view of a heat storage body as another variation of the first embodiment.
Figure 14B:
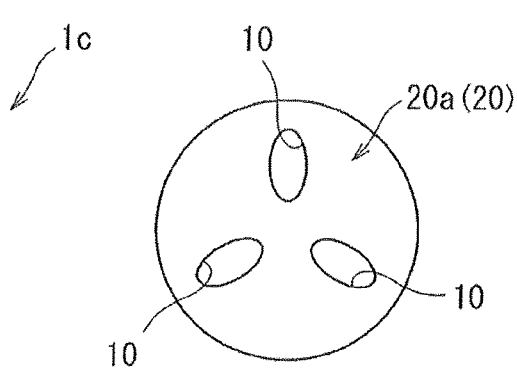
FIG. 14B is a plan view thereof.
Figure 15A:
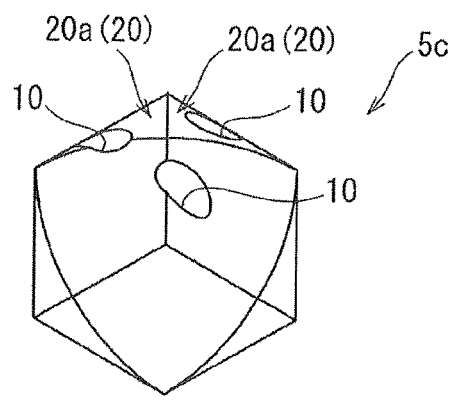
FIG. 15A is a perspective view of a heat storage body as another variation of the fifth embodiment.
Figure 15B:
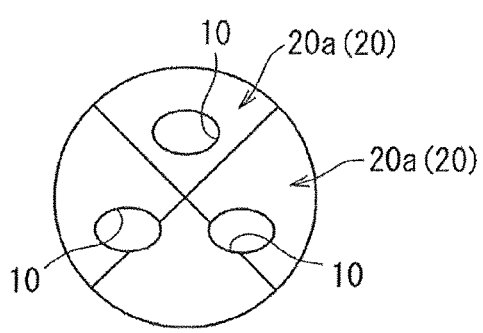
FIG. 15B is a plan view thereof.

FIGS. 14A and 14B illustrate the heat storage body 1c as another variation of the first embodiment and it is the same as the above-described heat storage body 1b as the variation of the first embodiment other than the shapes of the through-holes 10. FIGS. 15A and 15B illustrate the heat storage body 5c as another variation of the fifth embodiment and it is the same as the above-described heat storage body 5 in the fifth embodiment other than the shapes of the through-holes 10. It is needless to say that the second embodiment to the fourth embodiment and the sixth embodiment to the eighth embodiment also have variations in which the shapes of the through-holes 10 are elliptical shapes and variations in which the number of through-holes 10 is different in the same manner.

In addition, although the heat storage body that is used for the heat storage burner has been described above as the conventional technique, applications of the heat storage body in the invention are not limited thereto and the heat storage body in the invention can be used as a heat storage body for other heat storage devices such as a solar heat power generation device.

What is claimed is:

1. A heat storage body, which is made of ceramics, the heat storage body comprising:
    a plurality of through-holes extending in a single axial direction and having circular or elliptical cross sectional shapes orthogonal to the axial direction at a density ranging from 2 to 50 of the through-holes per square inch in a cross section orthogonal to the axial direction, wherein
    an outer shape of the storage body is circular as seen from at least one pair of views selected from a group consisting of a first pair of a plan view and a bottom view, a second pair of a front view and a back view and a third pair of a right side view and a left side view, and
    at least a cylinder inscribed face formed from a circular columnar body as a curved face according to a predetermined cylindrical shape having a longitudinal central axis so as to provide at least a part of an opened end face having an end surface where the plurality of the through-holes are extended wherein a number of the cylinder inscribed faces is one per each of the opened end faces if the cylinder inscribed faces share the longitudinal central axis while the number is two per each of the opened end faces if the cylinder inscribed faces fail to share the longitudinal central axis.

2. The heat storage body according to claim 1, wherein a full area of the opened end face is formed only by one cylinder inscribed face or two cylinder inscribed faces.

3. The heat storage body according to claim 2, wherein the outer shapes when seen from the two pairs of the views selected from the group are the circular shapes.

4. The heat storage body according to claim 2, wherein the outer shapes when seen from the three pairs of the views selected from the group are the circular shapes.

5. A method for manufacturing a heat storage body, comprising first forming a circular columnar body having a first central axis according to a predetermined cylindrical shape having a second central axis, wherein
    the circular columnar body is made of ceramics and includes a plurality of through-holes extending in a single axial direction and having circular or elliptical cross sectional shapes orthogonal to the axial direction at a density ranging from 2 to 50 of the through-holes per square inch in a cross section orthogonal to the axial direction, and
    the first forming is performed along a first direction that is orthogonal to the axial direction wherein the first center axis of the circular columnar body and the second center axis of the predetermined cylindrical shape intersect with each other.

6. The method for manufacturing the heat storage body according to claim 5, further including second forming according to the predetermined cylindrical shape along a second direction that is orthogonal to the first direction along which the circular columnar body has been previously formed according to the predetermined cylindrical shape wherein the first center axis of the circular columnar body and the second center axis of the predetermined cylinder intersect with each other while the second forming is being performed.

* * * * *

UNITED STATES PATENT AND TRADEMARK OFFICE
CERTIFICATE OF CORRECTION

PATENT NO. : 10,234,214 B2
APPLICATION NO. : 15/541632
DATED : March 19, 2019
INVENTOR(S) : Osamu Takagi and Shuichi Adachi Page 1 of 1

It is certified that error appears in the above-identified patent and that said Letters Patent is hereby corrected as shown below:

On the Title Page

Column 1, In (73) Assignee:
"TVK CORPORATION, Tokyo (JP)"
Should be:
"TYK CORPORATION, Tokyo (JP)"

Signed and Sealed this
Twenty-eighth Day of May, 2019

Andrei Iancu
*Director of the United States Patent and Trademark Office*